United States Patent

[11] 3,634,201

[72] Inventor Wolfgang Kehse
 Berlin, Germany
[21] Appl. No. 884,776
[22] Filed Dec. 24, 1969
[45] Patented Jan. 11, 1972
[73] Assignee Fried, Krupp GmbH
 Essen, Germany
 Continuation of application Ser. No.
 524,405, Feb. 2, 1966, now abandoned.
 This application Dec. 24, 1969, Ser. No.
 884,776

[54] METHOD FOR REMOVING VOLATILE
 IMPURITIES FROM RAW OIL BY SCRUBBING
 AND DISTILLATION WITH A STRIPPING GAS
 16 Claims, 3 Drawing Figs.

[52] U.S. Cl. .................................................. 203/42,
 203/37, 203/80, 203/79, 203/87, 203/92, 202/183,
 260/428
[51] Int. Cl. ........................................................ B01d 3/38,
 B01d 3/10
[50] Field of Search .......................................... 203/42, 49,
 87, 91–93, 95–97, 76, 37, 73, 79; 260/428;
 202/183, 186, 185 A

[56] References Cited
UNITED STATES PATENTS

| | | | |
|---|---|---|---|
| 2,136,774 | 11/1938 | Heckman ..................... | 260/428 |
| 2,621,197 | 12/1952 | Thurman ..................... | 260/428 |
| 2,793,235 | 5/1957 | Jenkinson ..................... | 203/42 |
| 3,239,547 | 3/1966 | Brion et al. ................... | 260/428 |
| 3,061,622 | 10/1962 | Fiala ............................ | 203/42 |
| 3,165,453 | 1/1965 | Sutter .......................... | 203/87 |
| 3,341,429 | 9/1967 | Fondrk ........................ | 260/428 |

Primary Examiner—Wilbur L. Bascomb, Jr.
Attorney—Spencer & Kaye

ABSTRACT: A method of purification of liquid raw oil containing volatilizable impurities in which the raw oil is first fed into a scrubbing zone and from there into two subsequent purification zones, in one of which the impurities are volatilized and the volatilized impurities are passed into the scrubbing zone to be scrubbed with the fresh raw oil fed thereinto so that the latter will absorb the impurities and the raw oil thus containing an increased percentage of impurities is subjected in the other purification zone to purification in which at least a part of the impurities are removed by neutralization or distillation.

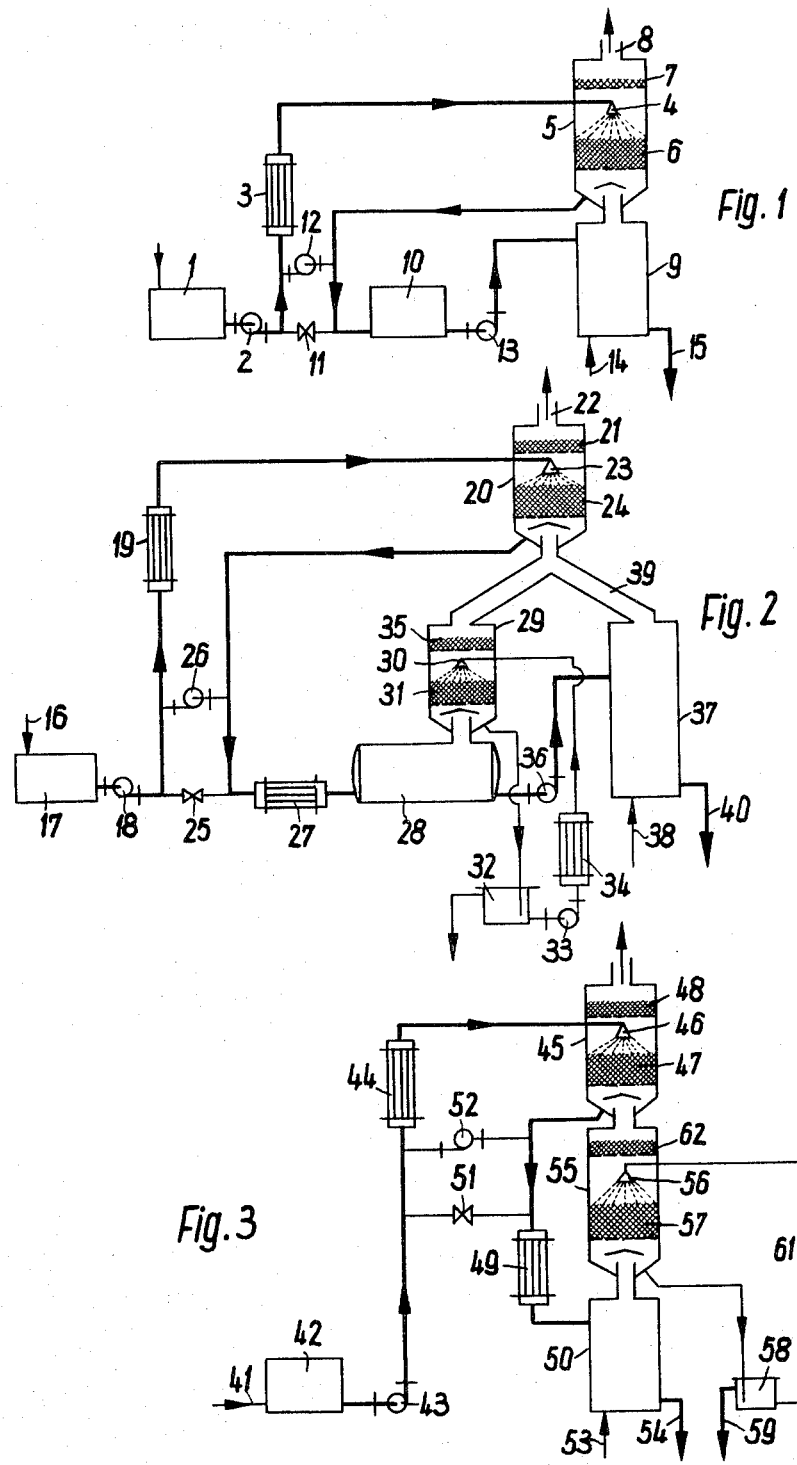

METHOD FOR REMOVING VOLATILE IMPURITIES FROM RAW OIL BY SCRUBBING AND DISTILLATION WITH A STRIPPING GAS

CROSS-REFERENCE TO RELATED APPLICATION

This application is a continuation of application Ser. No. 524,405, filed Feb. 2, 1966, now abandoned.

The present invention relates to a method and apparatus for removing volatilizable impurities from organic materials.

More particularly, the present invention is concerned with improvements of conventional methods of treating organic materials generally, or more specifically fats and oils destined for nutritional or technical purposes, by keeping the waste waters derived from injection condensation devices of steam jet vacuum apparatus or the like which are used, for instance, in deodorization arrangements, free of impurities.

Thus, the present invention is particularly concerned, however, without being limited thereto, with improvements of conventional methods and apparatus for the deodorization of, for instance, fish oils utilizing hydrogen gas as the inert gas. Furthermore, the present invention may also be advantageously applied to conventional processes of the petroleum or mineral oil industry, according to which wax or petroleum jelly or also lubricating oil fractions are treated under a partial vacuum by blowing steam at elevated temperature through the material.

In carrying out such processes, considerable amounts of waste waters accrue and, up to now, purification of these waste waters to such an extent that they may be easily disposed of frequently involved very considerable expenses. The elimination of such impurities from the waste waters, or prevention of the introduction of such impurities into the waste waters, represents a question of major technical and economical importance.

Arrangements were proposed which operate with surface condensation devices at which volatilized impurities, carried along by the steam-containing gaseous mixture derived in the purification of the organic material, should condense. Furthermore, arrangements were proposed in which either condensate is injected into the water vapor- and impurities-containing gaseous stream, or in which the vapors are washed with fatty acids of the type contained in the original oil, fat or the like. These types of arrangements and processes are described, for instance, in "Seifen-Oele-Fettes Wachse" No. 9, 1956, page 228; and also in German-published patent application DAS 1,133,489.

However, all of these methods and devices require that the vapors just before being released or condensed are contacted with condensate containing the same type of impurities as the organic material which is to be treated. Particularly if the material which is to be deodorized contains a proportion of easily volatilizable, low-boiling impurities, it might, and frequently will, occur that even at condensation temperature the partial pressure of one or several of the impurities will be so high that the concentration of these impurities in the treated vapors or the waste water derived therefrom still will be higher than permissible.

It is therefore an object of the present invention to overcome the above-discussed difficulties and disadvantages in the removal of volatilizable impurities from organic material, particularly fats, oils, waxes and the like.

It is another object of the present invention to provide a method and apparatus for the removal of volatilizable impurities from organic material which will permit the release of a water vapor-containing gaseous mixture which is substantially free of, or contains only insignificant amounts of the volatilizable impurities of the organic material which is to be purified so that waste water formed by condensation of these vapors will be sufficient purity to be released without causing any difficulties.

It is a further object of the present invention to provide a method and apparatus for the purification of volatilizable impurities of any organic material which will result in waste waters of sufficient purity so that disposal thereof does not cause any difficulties, and which can be carried out in a simple and economical manner.

Other objects and advantages of the present invention will become apparent from a further reading of the description and of the appended claims.

With the above and other objects in view, the present invention contemplates in a method of purification of volatilizable impurities-containing organic material, the steps of subjecting the organic material to subatmospheric pressure sufficiently low to strip at least a substantial portion of the volatilizable impurities, thereby forming a purified organic material and a gaseous mixture containing volatilized impurities, and scrubbing the gaseous mixture with successive portions of the organic material so as to withdraw at least a substantial portion of the volatilized impurities from the gaseous mixture and incorporating the withdrawn portion in the successive portions of the organic material thereby increasing the content of volatilizable impurities thereof, the thus-formed successive portions of organic material of increased volatilizable impurities content serving as volatilizable impurities-containing raw material for subsequent purification.

The present invention also includes in an apparatus for the purification of volatilizable impurities-containing organic material, in combination, scrubbing means for scrubbing a gaseous mixture containing the impurities in volatilized form with a liquid organic material containing the impurities in volatilizable form, so as to increase the concentration of the impurities in the liquid organic material and to at least substantially decrease the concentration of the impurities in the gaseous mixture, withdrawal means for withdrawing the gaseous mixture of at least substantially reduced impurities concentration from the scrubbing means; volatilizing means communicating with the scrubbing means for receiving the liquid of increased impurities concentration formed in the scrubbing means, and for stripping at subatmospheric pressure at least a major portion of the volatilizable impurities contained in the liquid, thereby forming a gaseous mixture containing the impurities in volatilized form and organic liquid material of substantially reduced impurities content, conduit means for introducing the gaseous mixture containing the impurities into the scrubbing means, introducing means for introducing liquid impurities-containing material into the scrubbing means, and recovery means for recovering from the volatilizing means organic liquid material of substantially reduced impurities content.

The prior art difficulties and disadvantages in the method of separating volatilized impurities which lend themselves to condensation from the mixture of inert gas and water vapors such as are produced during the deodorization and/or acid distillation of oils, fats, waxes and the like under a high degree of vacuum, are thus overcome according to the present invention by scrubbing such gaseous mixture with subsequent portions of the organic raw material from which the volatilizable impurities are to be removed and which therefore will contain impurities of the same type as the condensable impurities contained in the water vapors or the gaseous mixture.

According to Raoult's Law, the fraction by which the vapor pressure of a liquid is lowered when a small amount of a nonvolatile substance is dissolved in it, is equal to the mole fraction of the solute, or, in other words, under equilibrium conditions, the partial pressure of one component in the water vapors-containing gaseous mixture is proportional to the mole fraction of the same component in the liquid phase. Thus, by scrubbing with the condensate formed of the vapors, which condensate contains the volatilizable impurities in very high concentration, the scrubbing liquid, i.e. the condensate, will contain a high-mole fraction of the impurities. In contrast thereto, when using the liquid organic raw material, such as an oil, fat or the like, as the scrubbing liquid, the mole fraction of the impurities therein will be much lower, inasmuch as the concentration of volatilizable impurities in the liquid organic starting material is considerably lower than in the condensate of the water vapors formed in the steam jet vacuum apparatus or the like which is used for stripping such impurities from the starting material.

Thus, in the case of oils and fats, the mole fraction of these volatilizable impurities in the raw oil or the like which is to be purified will be of the magnitude of between 0.15 and 0.01, as compared to a mole fraction of up to 1 in the condensate.

In a similar ratio, the partial pressure of the fatty acids in the water vapors withdrawn from the purification device is also reduced and consequently also the proportion of fatty acids in the waste waters formed by condensation of the water vapors.

A further reduction of the fatty acid proportion in the waste water is achieved by using the raw oil or the like for scrubbing of the volatilized fatty acid-containing vapors, due to the fact that generally the solidification point of the raw oil or the like is considerably lower than the solidification point of the condensed fatty acids. Due to this fact, it is possible to operate a scrubber in which the vapors are scrubbed with raw oil or other liquid organic material which is to be purified, at a considerably lower temperature than a scrubber in which condensed fatty acids are used as the scrubbing liquid. Consequently, it is possible to operate at a lower temperature of the vapors or vapors-containing gaseous mixture, and this in turn will considerably reduce the partial pressure of the fatty acids component and thus the residual fatty acid content of the scrubbed water vapors which, upon condensation form waste water.

In addition to the above-discussed advantage which permits a highly significant reduction in the residual fatty acid content of the waste water, the use, in accordance with the present invention, of the starting material, such as oil, as the scrubbing liquid will result in a great procedural advantage, due to the fact that the condensed impurities which are taken up by the starting material during the scrubbing can be separated therefrom in the same process step in which the major portion of the impurities initially contained in the starting material are separated therefrom.

Generally, during the deodorization step, or the stripping of impurities, for instance in a steam-fed vacuum apparatus, only residual portions of the volatilizable impurities are separated from the organic material such as an oil, fat, or wax, while the major portion of these volatilizable impurities is separated in a preceding process step. For instance, during the purification of oils, generally the free fatty acid content of the raw oil is reduced by treatment with alkali until only a small residual portion of the free fatty acids is present in the oil. This residual portion is then stripped off to a large extent during the deodorization, for instance in a conventional steam jet vacuum apparatus, and only this residual portion of the free fatty acids will eventually be found in the waste water of the deodorization apparatus. It then, in accordance with the present invention, the water vapors emanating from the deodorization apparatus are washed with the raw oil, then the amount of free fatty acid in the raw oil will be increased by the amount thereof which is taken up from the water vapors. This additional amount of fatty acids will be removed during the alkaline deacidification or other preliminary purification down to the same residual amount of free fatty acids which would be retained in the raw oil if the same had not been used for scrubbing of the water vapors and thus would not contain an increased amount of free fatty acids. It follows, that the refined product obtained in the alkaline deacidification process will pass to the deodorizing apparatus with the same amount or proportion of free fatty acids therein, irrespective of whether or not the raw oil has been used for scrubbing of the water vapors previously formed in the deodorization apparatus.

The present invention can be utilized in a similar manner in processes wherein the major portion of the volatilizable impurities is withdrawn not by treatment with chemicals, such as treatment with lye, but by a distillation process which precedes the thus described volatilization or the like. In the latter case, the additional amount of volatilizable impurities which is taken up by the raw oil or the like during scrubbing of the water vapors derived from the deodorization apparatus will be removed by distillation together with the initial volatilizable impurities content of the raw oil, so that the residual amount of volatilizable impurities in the oil after the distillation process and prior to deodorization will be the same irrespective of whether the content of volatilizable impurities in the oil has been increased by using the raw oil as a scrubbing liquid for the water vapors emanating from the deodorization apparatus.

Furthermore, it is also possible to carry out the separation of the major proportion of volatilizable impurities by distillation jointly with deodorization of the oil or the like. According to this embodiment of the present invention, the major proportion of volatilizable impurities is first separated from the water vapors-containing gaseous stream by means of a conventional condensing device. Thereafter, the water vapors-containing gaseous mixture is scrubbed with the raw oil or the like and thereby, the residual portion of volatilized impurities contained in the water vapors, or at least a major proportion thereof, will be taken up by the raw oil.

According to the two last-described embodiments, wherein the major proportion of volatilizable impurities is separated by distillation, a further advantage will be achieved with respect to the method of the present invention.

It is conventional and generally necessary prior to treating materials which are sensitive to oxygen at substantially elevated temperatures, to degas such materials. This is carried out by subjecting the material at an elevated temperature to a partial vacuum while the same passes through a suitable, conventional column or the like. If, in accordance with the present invention, the starting material is used for scrubbing the water vapors-containing gas, then during such use of the starting material the same will be simultaneously degassed so that a separate degassing step prior to distillation or deodorization of the raw material will no longer be required.

By proceeding according to the present invention, for deodorizating or deacidifying fats and oils by distillation, the neutral oil, vapor scrubber device may be built of iron, in contrast to a fatty acid condenser or scrubbing device which is operated with condensate of high-fatty fatty acid content, since at such high concentration of the fatty acids in the neutral oil the condenser or the scrubber would be corroded. This will not be the case if, in accordance with the present invention, the starting material is used as a scrubbing liquid and thus the concentration of fatty acids in the scrubber will remain relatively low.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic illustration of an arrangement for the separation of volatilizable and condensable impurities during the purification of oils, fats and the like;

FIG. 2 is a schematic illustration of an arrangement for the separation of volatilizable and condensable impurities during the purification of oils and fats, which includes deacidification by distillation; and FIG. 3 is a schematic illustration of an arrangement according to FIGS. 1 and 2 wherein, however, the distillation of the fatty acids and the deodorization are carried out in one and the same apparatus.

As seen in FIG. 1, the raw oil is passed from container 1 by way of pump 2 and cooler 3 and then through nozzle 4 into scrubber 5. In cooler 3, the raw oil is cooled to a temperature which is only slightly above the solidification point of the oil. The term "raw oil" is meant to denote the type of volatilizable impurities containing organic material which may be subjected to refining and which also serves as the scrubbing liquid for the water vapors-containing gas emanating from the inert gas or steam vacuum purification device.

Nozzle 4 serves for finely spraying the oil over a layer 6 of packing or filler material which may consist of Raschig rings, Intalox bodies or the like.

A second layer 7 of filler material is arranged in scrubber 5 above nozzle 4 for the purpose of preventing the carrying-over of liquid particles into the vacuum apparatus which communicates with scrubber 5 at outlet 8.

Oil trickles through filler material layer 6 toward the bottom of the scrubber, while simultaneously the gas and vapor mixture emanating from deodorizer 9 is introduced into the bottom portion of the scrubber, passes through filler material layer 6 and gives up its fatty acid content to the neutral oil flowing downwardly from nozzle 4. The thus fatty acid-charged neutral oil collects at the bottom of washer 5 and passes from there through conduit 10' into the next process step, namely the refining apparatus 10.

It is sometimes desirable to use only a portion of the raw oil which is to be purified for trickling or otherwise passing through filler layer 6 of scrubber 5. In this case, another portion of the raw oil which is conveyed by pump 2 may be passed through valve 11 directly into refining apparatus 10. Furthermore, it may be desirable to circulate the scrubbing oil several times prior to introduction into refining apparatus 10. For this purpose, a circulation pump 12 may be provided through which the oil from the bottom of scrubber 5 will be recirculated to nozzle 4 by way of cooler 3.

In refining stage or apparatus 10, the major proportion of the free fatty acids which initially were contained in the raw oil and/or which were introduced into the crude oil in scrubber 5 are removed. This is generally done in conventional manner by treatment with alkali and may be followed by drying and treatment with bleaching earth for decolorizing the oil. After passing through stage 10, the oil is pumped by means of pump 13 into deodorizer 9 which may operate as a continuous deodorizer or also in a batchwise manner. In deodorizer 9, the oil is treated with finely subdivided steam which is introduced into deodorizer 9 as indicated by arrow 14. After such treatment has continued for the required length of time, as well known to those skilled in the art, the residual free fatty acid of the oil, and other distillable impurities, will be stripped from the oil into the vapor phase. These impurities, together with the vapors are then introduced into the bottom portion of scrubber 5 and therein the impurities will be taken up to a very large extent by the raw oil introduced through nozzle 4. After carrying out treatment in deodorizer 9 for the required length of time, the thus purified oil is withdrawn as indicated by arrow 15.

In accordance with the arrangement illustrated in FIG. 2, the raw oil is introduced at 16 into the first treating stage 17 in which, by suitable conventional treatment, mucilaginous materials and other nondistillable impurities are separated from the oil. The thus pretreated oil is then passed by means of pump 18 through cooler 19, in which the oil is again cooled to a temperature just above its solidification point, and from there to vapor scrubber 10. Vapor washer 20 is again provided with an upper layer 21 of filler material which prevents the carrying along of droplets of liquid into vacuum apparatus 22. The oil introduced into scrubber 20 from cooler 19 is sprayed through nozzle 23 over a layer 24 of filler material and will collect in the lower portion or sump of scrubber 20. As described in connection with FIG. 1, it may be desirable to use only a portion of the raw oil for scrubbing of the vapors-containing gaseous mixture, and this can be achieved by utilizing valve 25 for passing part of the raw oil directly to distilling apparatus 28. On the other hand, it may also be desirable to recirculate the scrubbing oil several times through scrubber 20. This can be accomplished by operation of circulating pump 26.

The oil which in scrubber 20 has absorbed free fatty acids from the water vapors then passes through preheater 27 into distillation apparatus 28 in which the fatty-acids-containing oil is heated at a high temperature while simultaneously being maintained under a high degree of vacuum so that the distillable constituents, particularly impurities which may be removed by distillation, will be removed from the oil. If desirable, it is also possible to introduce steam into the distillation apparatus during operation of the same. The distillation apparatus, per se, is well known to those skilled in the art and may be operated in a continuous or batchwise manner.

The vapors which are expelled from the oil pass through a fatty acid condenser 29 which is illustrated in FIG. 2 as a direct condenser with circulating fatty acid. In condenser 29, cooled fatty acid is sprayed through nozzle 30 over a layer 31 of conventional filler material, withdrawn at the bottom of condenser 29, passed into vessel 32 and withdrawn therefrom at atmospheric pressure. The condensed portion of the fatty acid is thus withdrawn from vessel 32 while the still-vaporized portion thereof is passed by means of circulating pump 33 through fatty acid cooler 34 to nozzle 30 and is used again for trickling through filler material layer 31. In filler material layer 31, the major portion of the free fatty acid which has been distilled off in distillation device 28 is condensed, with the exception of a residual amount which, corresponding to the partial pressure of the fatty acid in condenser 29 is still volatile at the prevailing temperature and subatmospheric pressure. In order to prevent carrying along of liquid droplets, a further layer 35 of filler material is provided in the upper portion of fatty acid condenser 29, and the vapors have to pass through layer 35. The oil is pumped by means of pump 36 from distillation device 28 into the deodorizer 37 into which steam is introduced as indicated by arrow 38. Within deodorizer 37 which may be a conventional continuously or batchwise-operating apparatus, the residual free fatty acids or other volatilizable impurities are stripped from the oil at elevated temperature and high vacuum. The stripped volatilized constituents of the oil leave the deodorizing apparatus through conduit 39. As indicated by arrow 40, the thus purified oil is withdrawn from deodorizer 37. The vapors which are withdrawn from fatty acid condenser 39 and deodorizer 37 may be combined below scrubber 20 and will then be jointly scrubbed in scrubber 20 by means of the raw oil which is passed through the prepurification. The oil removes from the vapors the residual free fatty acid content and any other condensable constituents thereof.

Referring now to the arrangement illustrated in FIG. 3, it will be seen that the distillation of the fatty acids and the deodorization are carried out in a joint apparatus. Similar to what has been described in connection with FIG. 2, the raw oil is introduced at 41 into a pretreatment stage 42 and, after such pretreatment is passed by means of pump 43 through cooler 44 into scrubber 45. Scrubber 45 is substantially constructed in the same manner as the scrubbers in FIGS. 1 and 2. The oil is evenly distributed on filler layer 47 by means of nozzle 46. Carrying along of liquid droplets into the vacuum apparatus is prevented by layer 48 of filler material which is arranged above nozzle 46. The pretreated oil after passing through scrubber 45 leaves the same at the bottom portion thereof and passes through heat exchanger 49, in which the oil is heated, into a combined deacidification and deodorizing apparatus 50. In a manner similar to that described with respect to FIGS. 1 and 2, valve 51 and pump 52 are provided in the event that only a portion of the raw oil is to be passed through scrubber 45, or if the oil should be recirculated several times through scrubber 45. In the deodorizing and deacidification apparatus 50, the oil is treated at elevated temperature with steam introduced at 53, and the thus treated and purified oil leaves the combined deodorizer and deacidifier as indicated by arrow 54.

The vapors which were thus enriched with fatty acids and other volatile impurities leave deodorizer 50 at the upper end thereof and are introduced into fatty acid condenser 55, the latter being operated with circulating cooled fatty acids as described in connection with FIG. 2. The cooled fatty acids are finely distributed over layer 57 of filler material by being sprayed onto the same through nozzle 56. The fatty acids then are withdrawn from the bottom of condenser 55 and collected in container 58 from which, as indicated by arrow 59, condensed fatty acid is withdrawn at atmospheric pressure, and a portion thereof taken up by pump 60. The portion of fatty acid which passes through pump 60 is then conveyed through cooler 61 back to nozzle 56 for distribution on layer 57 of filler material.

The vapors which are thus freed of the major portion of the fatty acid pass through layer 62 of filler material in order to prevent carrying along of droplets of liquid and then leave the fatty acid condenser at the top thereof for introduction into the bottom portion of scrubber 45, wherein, within layer 47 of filler material, the last traces of fatty acids and other volatilizable impurities are removed from the vapors in contact with the pretreated raw oil which has been sprayed through nozzle 46.

It is rather important, and thus will be mentioned again, that the scrubber in which the vapors are washed with raw oil may in nearly all cases be built of iron, while the fatty acid condensers must have at least inner surfaces of rustproof steel, in view of the high degree of chemical reactivity of the free fatty acids.

The following examples, which will make reference to the drawing, are given as illustrative only, without, however, limiting the invention to the specific details of the examples.

EXAMPLE 1

Soybean or peanut oil may be processed in the arrangement illustrated in FIG. 1, in the following manner:

The oil in storage container 1 may have a content of 1 percent of free fatty acids. Conventionally, i.e. without the scrubbing of vapors in accordance with the present invention, the free fatty acid content is reduced in refining stage 10, in conventional manner, for instance by treatment with lye, to about 0.1 percent. Upon deodorization in deodorizer 9, the fatty acid content is further reduced to about 0.03 percent so that an amount of fatty acid equal to about 0.07 percent of the amount of oil which is to be purified will pass with the vapors into the vacuum apparatus and thus into the waste water. Devices without the vapor scrubber according to the present invention show in the waste water of the vacuum apparatus a contamination equal to between about 60 and 100 p.p.m. of fatty acid. By interposition of vapor scrubber 5 according to the present invention, the major portion of the 0.07 percent fatty acid which were stripped in deodorizer 9 will be taken up by the raw material such as soybean oil or peanut oil which is used as the scrubbing liquid. Thereby, the fatty acid content of the raw oil rises from about 1.0 percent to about 1.06 percent. For the operation in refining stage 10 in which the raw oil is treated with lye, it is immaterial whether the free fatty acid content of the oil is 1.0 or 1.06 percent. In either case, the oil will leave refining stage 10 with a free fatty acid content of 0.01 percent.

Consequently, of the 0.07 percent of fatty acid, only about 0.01 percent or even less will pass into the vacuum apparatus and into the waste water so that the contamination of the waste water will be reduced to less than 20 p.p.m. which degree of contamination is generally permissible.

EXAMPLE 2

The process as illustrated in FIG. 2 is particularly suitable for treating palm oil containing between 5 and 12 percent fatty acid. In the deacidification stage 28, the fatty acid content is reduced by steam distillation to between about 0.5 and 0.3 percent. The main portion of the driven-off fatty acid is condensed in condenser 30, as described in connection with FIG. 2. The vapors leaving condenser 30, however, may still contain considerable quantities of fatty acid. For instance at a condensation temperature of 40° C. and subatmospheric pressure of 25 mm./Hg., the vapors may contain capric acid with eight carbon atoms, which cannot be condensed under these conditions, in an amount of about 6.5 grams per kilogram of steam.

The fatty acid content of the palm oil is reduced in deodorizer 37 from between 0.5 and 0.3 percent to about 0.03 percent. The vapors leaving deodorizer 37 and containing between 0.47 and 0.27 percent fatty acids are introduced jointly with the vapors from the fatty acids condenser 30 into scrubber 20 wherein the vapors are washed with raw oil so that the fatty acid content of the raw oil used for scrubbing the vapors will increase from between 5 and 12 percent to between 5.47 and 12.47 percent or between 5.27 and 12.27 percent.

The amount of fatty acid which is contained in the vapors leaving scrubber 20 depends on the vapor pressure of the individual fatty acid, reduced in the ratio of mole fraction of fatty acid and neutral oil in the scrubbing liquid. This reduction in the amount of fatty acid in the vapors leaving scrubber 20 as compared with the vapors leaving condenser 30 can be calculated, for instance for capric acid ($C_8$) at 40° C., 25 mm./Hg. pressure and 5 percent free fatty acid in the raw oil, in the following manner.

$$X_{FS} = \frac{Z_1 \times M_2}{Z_2 \times M_1} = \text{Mole fraction}$$

Whereby:

$Z_1$ (The fatty acids content of the raw material) = 5 percent
$Z_2$ (The neutral oil content of the raw material) = 95 percent
$M_2$ (The molecular weight of the neutral oil) = 870
$M_1$ (The molecular weight of capric acid) = 144
$X_{FS} = 0.032$ The above-mentioned proportion of capric acid, namely 6.5 g./kg. water vapor is thus reduced to 6.5×0.032, or to about 0.2 g. capric acid per kilogram water vapor, so that only generally permissible traces of fatty acid will be found in the waste waters.

EXAMPLE 3

The process in accordance with FIG. 3 of the drawing is particularly suitable for working up coconut oil and palm kernel oil containing between 1 and 10 percent fatty acids. These oils are first treated in a pretreating stage 42, for instance with phosphoric acid and Fuller's earth, for removing mucilaginous substances. Then, the entire fatty acid content is stripped in one stage, namely in deodorizer 50, and the stripped fatty acid is condensed in fatty acid condenser 55. Since, as described in example 2, fatty acid condenser 55 is not capable of completely condensing the entire fatty acid content, the residual amount of fatty acid in the vapors is further reduced in scrubber 45 in the ratio of the mole fractions.

It will be understood that each of the elements described above, or two or more together, may also find a useful application in other types of oil and the like purification arrangements differing from the types described above.

While the invention has been illustrated and described as embodied in an oil and the like purifying arrangement including a device for scrubbing volatile impurities-containing vapors with the raw oil or the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method for processing a raw oil containing volatilizable impurities including fatty acids, said oil being selected from the group consisting of liquid raw vegetable, mineral and fish raw oils, comprising the steps of removing from the raw oil a portion of said impurities to yield an oil product having a reduced volatilizable impurity content, deodorizing said oil product with an inert gas under vacuum in a deodorizer for allowing volatilizable impurities still present in said oil product after the step of removing to be stripped out of said oil product by said inert gas, scrubbing the inert gas resulting from the step of deodorizing with raw oil for allowing said inert gas to give up to said raw oil the impurities acquired by said inert gas in the step of deodorizing, and passing the raw oil used in the step of scrubbing to the step of removing.

2. A method as claimed in claim 1, wherein said inert gas is steam.

3. A method as claimed in claim 2, wherein said oil is a vegetable oil.

4. A method as claimed in claim 3, wherein said vegetable oil is selected from the group consisting of soybean oil, peanut oil, palm oil, coconut oil and palm kernel oil.

5. A method for processing a raw oil containing volatilizable impurities, comprising the steps of distilling from the raw oil a portion of said impurities to yield a volatilized impurity product and an oil product having a reduced volatilizable impurity content, partially condensing said volatilized impurity product by spraying thereinto said volatilized impurity product in a cooled condensed state, there remaining after the step of partially condensing a portion of said volatilized impurity product still in the volatilized state, deodorizing said oil product with an inert gas under vacuum in a deodorizer for allowing volatilizable impurities still present in said oil product after the step of removing to be stripped out of said oil product by said inert gas, scrubbing the inert gas resulting from the step of deodorizing and said volatilized impurity product still in the volatilized state after the step of partially condensing with raw oil for allowing said inert gas to give up to said raw oil the impurities acquired by said inert gas in the step of deodorizing and for further condensing said volatilized impurity product, and passing the raw oil used in the step of scrubbing to the step of distilling.

6. A method as claimed in claim 5, wherein said inert gas is steam.

7. A method as claimed in claim 6, wherein said volatilizable impurities include fatty acids, said oil being selected from the group consisting of liquid raw vegetable, mineral and fish raw oils.

8. A method as claimed in claim 7, wherein said oil is a vegetable oil.

9. A method as claimed in claim 8, wherein said vegetable oil is palm oil.

10. A method as claimed in claim 9, wherein said palm oil contains capric acid.

11. A method for processing a raw oil containing volatilizable impurities, comprising the steps of distilling and deodorizing said raw oil with an inert gas to yield an oil product substantially free of said volatizable impurities and for allowing said volatilizable impurities to be stripped out of said raw oil by said inert gas, partially condensing the volatilized impurities in said inert gas following the step of distilling and deodorizing by spraying thereinto cooled condensed volatilizable impurities previously condensed from the volatilized impurities in said inert gas following the step of distilling and deodorizing, there remaining after the step of partially condensing a portion of the volatilized impurities still in the volatilized state in said inert gas, scrubbing the inert gas following the step of partially condensing with raw oil for allowing said inert gas to give up to said raw oil the volatilized impurities still in the inert gas following the step of partially condensing, and passing the raw oil used in the step of scrubbing to the step of distilling and deodorizing.

12. A method as claimed in claim 11, wherein said inert gas is steam.

13. A method as claimed in claim 12, wherein said volatilizable impurities include fatty acids, said oil being selected from the group consisting of liquid raw vegetable, mineral and fish raw oils.

14. A method as claimed in claim 13, wherein said oil is a vegetable oil.

15. A method as claimed in claim 14, wherein said vegetable oil is selected from the group consisting of coconut oil and palm kernel oil.

16. A method as claimed in claim 15, wherein said vegetable oil contains between 1 and 10 percent fatty acids.

* * * * *